Feb. 9, 1954 C. G. JOHNSON 2,668,926
COMMUTATED WOUND ARMATURE ASSEMBLY
Filed June 7, 1952 3 Sheets-Sheet 1

INVENTOR.
Claus G. Johnson
BY
ATTORNEYS

Feb. 9, 1954          C. G. JOHNSON          2,668,926

COMMUTATED WOUND ARMATURE ASSEMBLY

Filed June 7, 1952          3 Sheets-Sheet 2

INVENTOR.
Claus G. Johnson
BY
ATTORNEYS

Feb. 9, 1954    C. G. JOHNSON    2,668,926
COMMUTATED WOUND ARMATURE ASSEMBLY
Filed June 7, 1952    3 Sheets-Sheet 3

INVENTOR.
Claus G. Johnson
BY
ATTORNEYS

Patented Feb. 9, 1954

2,668,926

UNITED STATES PATENT OFFICE 2,668,926

COMMUTATED WOUND ARMATURE ASSEMBLY

Claus G. Johnson, Rockford, Ill., assignor to Barber-Colman Company, Rockford, Ill., a corporation of Illinois Application June 7, 1952, Serial No. 292,360

4 Claims. (Cl. 310—265)

This invention relates to a motor of the type in which a plurality of coils are wound on the core of the rotor and lie in planes paralleling the rotor axis. In such motors, the coils are energized from a source of current connected to the coils through brushes contacting the segments of a commutator ring which is mounted on the rotor. The terminals of each coil are connected to two adjacent segments and, when one of the brushes contacts both segments, the coil is short circuited. During the period in which the coils are short circuited, a current is generated in the coils producing a counterflux which opposes the motor action. Interruption of this current also causes sparking between the brushes and the commutator segments. The magnitude of this current is approximately proportional to the angular distance between the plane of the coil which is short circuited and a neutral plane, that is, a plane parallel to the neutral axis of the stator field. In prior constructions, the angle through which the coils turn while short circuited either begins or ends at a neutral plane and thus the maximum current generated is proportional to this angle.

The general object of the invention is to provide a new and improved rotor in which the current generated in the short circuited coils is reduced improving the efficiency of the motor due to the decreased counterflux and reducing the rate of brush wear and the noise in nearby radios caused by sparking.

The principal object is to reduce the generated current by arranging the coils in a novel manner with respect to each other and to the commutator segments so that the angle through which each coil turns as it is short circuited by the brushes is bisected by a neutral plane whereby the maximum current generated is proportional to only half of this angle.

A more detailed object is to arrange successively short circuited coils in planes defining between them an angle equal to the angle between the corresponding commutator segments of the coils and to dispose all the coils short circuited at any one time in parallel planes.

Other objects and advantages of the invention will become apparent from the following detailed description taken in connection with the accompanying drawings, in which Figure 1 is a schematic end view of the improved rotor.

Figure 4:
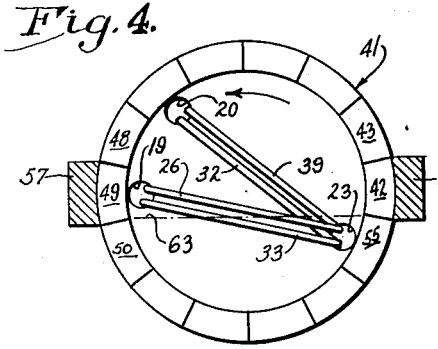
Figure 5:
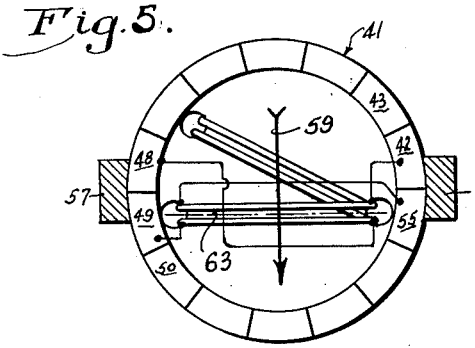
Figure 6:
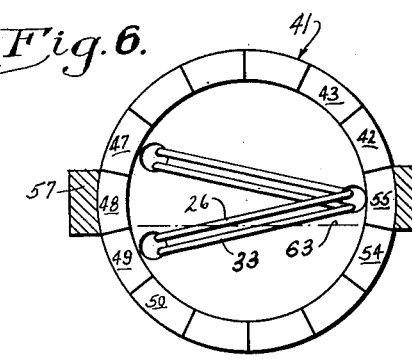

Figs. 4, 5, and 6 are schematic views of the improved rotor showing the latter in different positions.

Figure 7:
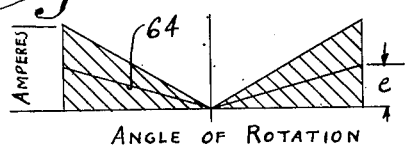

Fig. 7 is a graph representing the current generated in the shorted coils of the improved rotor.

Figure 8:
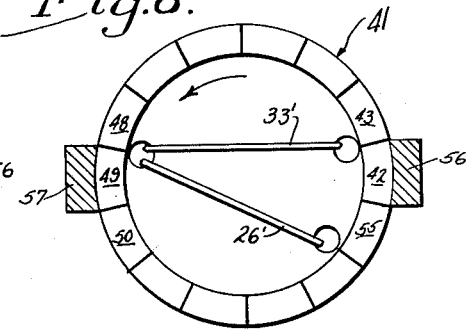
Figure 9:
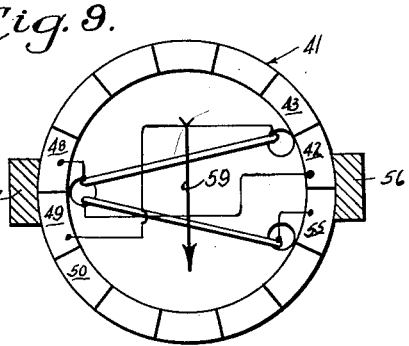
Figure 10:
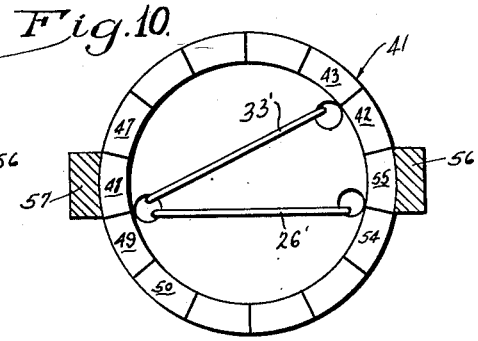

Figs. 8, 9 and 10 are schematic views of a conventional rotor in positions corresponding to those shown in Figs. 4, 5, and 6.

Figure 11:
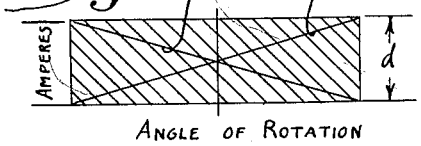

Fig. 11 is a graph illustrating the current generated in the shorted coils of the conventional rotor.

Figure 3:
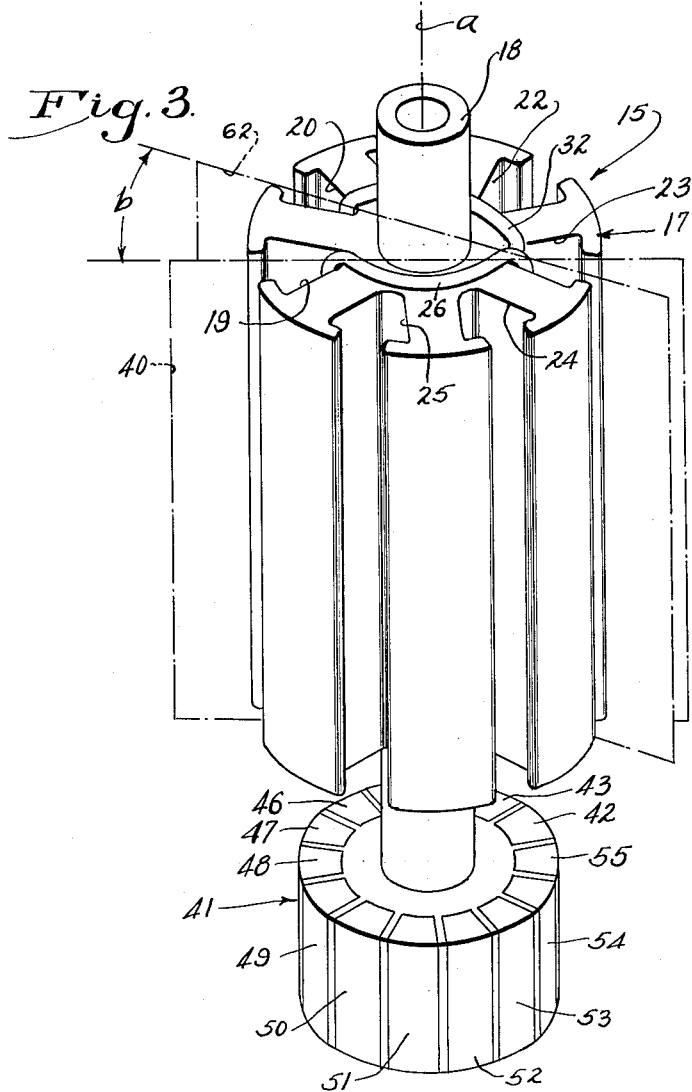
Fig. 3 is a perspective view of the rotor core showing the manner in which the coils are wound.

The electric motor shown in the drawings comprises a rotor 15 disposed between the magnetic poles 16 of the stator of the motor. The rotor includes a cylindrical core 17 (Fig. 3) of magnetic material mounted on a shaft 18 extending through the center of the core to turn about an axis $a$ midway between the poles 16. A plurality of slots 19 to 25 extending longitudinally of the rotor are formed in the periphery of the core 17 and are angularly spaced at equal intervals about the core axis.

Figure 1:
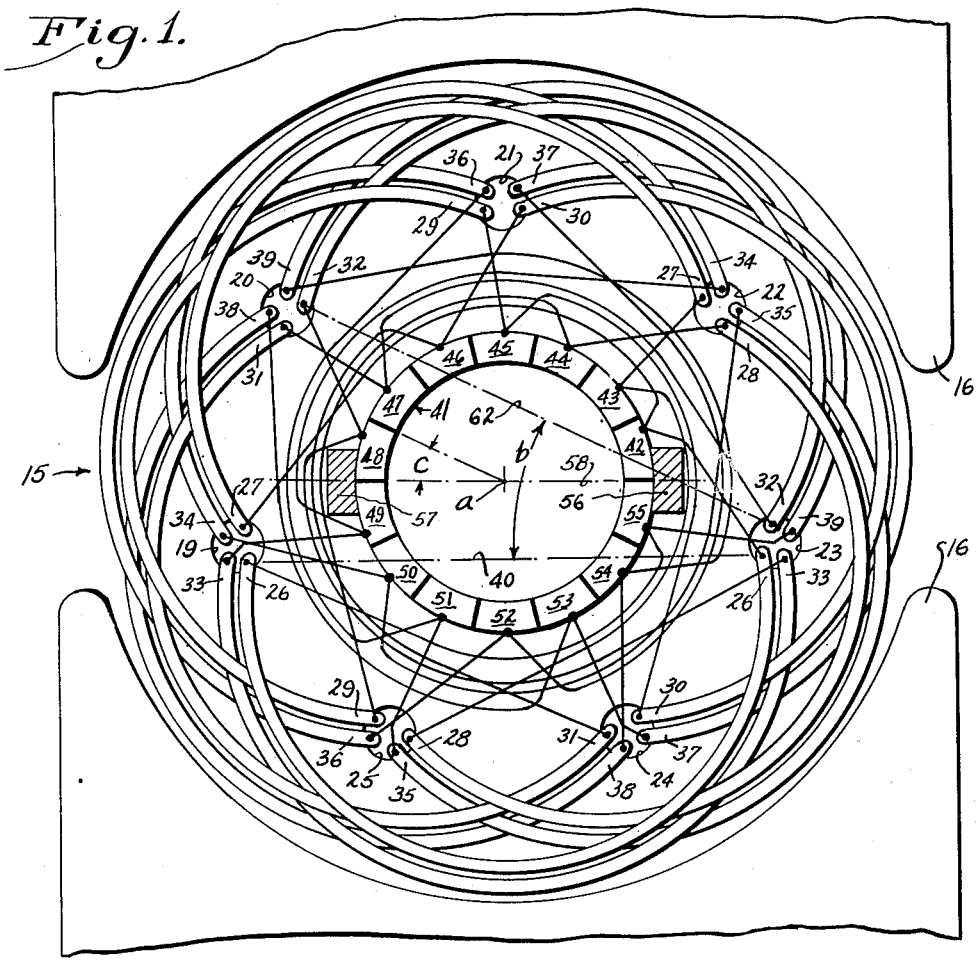

Wound on the core 17 in the slots 19 to 25 are a plurality of multiple turn coils 26 to 39. The coil 26, for example, is disposed in the slots 19 and 23 and lies substantially in a plane 40 (Fig. 3) paralleling the rotor axis $a$. As shown in Fig. 1, the other coils are wound in similar pairs of slots to lie in individual planes which are also parallel to the rotor axis. Herein, there are twice as many coils as there are slots and, therefore, one portion of each of four different coils is received in each slot.

Figure 2:
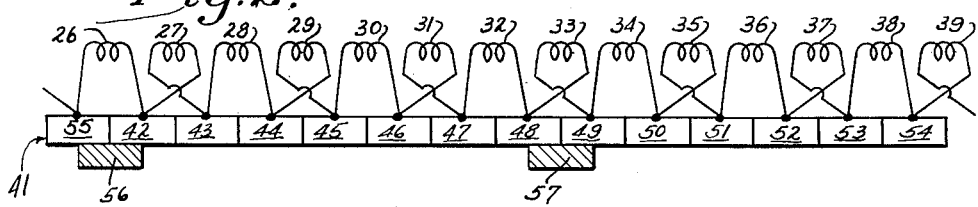
Fig. 2 is a schematic development view of the rotor coils and the commutator segments.

Mounted rigidly on the shaft 18 beyond one end of the core 17 is a commutator ring 41 which is centered about the axis $a$ and turns with the core. The commutator ring is divided into a plurality of segments 42 to 55, there being as many segments as there are coils, and the two terminals of each coil are connected to two adjacent segments as shown in Fig. 2. Each commutator segment is electrically insulated from the other segments and the arcuate lengths of the segments are equal.

To connect the coils 26 to 39 with a suitable supply of current, a pair of brushes 56 and 57 contact the commutator segments on diametrically opposite sides of the ring 41 and are disposed along a line 58 which is perpendicular to the direction of the field of the stator, indicated by the arrow 59 (Fig. 5), and defines the neutral axis of the field. Thus two parallel circuits through the coils are completed between the brushes. When the rotor 15 is in the position

a maximum value to zero as the rotor turns through the first half of the short circuiting period angle and then increases to the same maximum value during the remainder of the short circuiting period.

Although the coils 26 and 33 while short circuited turn through the same angle as do the coils 26' and 33' in the conventional rotor, the maximum angular distance between the coils and the neutral plane is only half the corresponding distance in the conventional rotor since, in the improved rotor, half of the movement of the coils occurs on each side of the neutral plane 63. Thus, the maximum generated current represented by the distance $e$ in Fig. 7 is only half the maximum current generated in the coils of the conventional rotor, that is $e$ is equal to one-half $d$, and the total current in each of the coils 26 and 33 is that designated by the area under the line 64 (Fig. 7), the sum of the currents being represented by the total shaded area. At the end of the short circuiting period of the coils 26 and 33, the coils 32 and 39 which are short circuited next are in the same position as were the coils 26 and 33 at the beginning of their short circuiting period, since the angle $b$ between the plane 40 of the coils 26 and 33 and the plane 62 of the coils 32 and 39 is equal to the angle through which the rotor turns during this period. The current generated in the next pair of coils, therefore, is the same as that in the previous pair.

From a comparison of the shaded areas in Figs. 7 and 11, it will be seen that the current generated in the coils of the improved rotor winding throughout the period of short circuiting is only half that generated in the coils of the conventional rotor. This is achieved by the combined effects of disposing the two coils which are shorted at any one time in parallel planes and arranging the coils so that the angle between successively short circuited coils is equal to the angle through which the rotor turns during the short circuiting period. As a result, the counterflux tending to neutralize the stator field is reduced by half in the improved rotor substantially increasing the efficiency of the motor. Due to the improved efficiency, less current is required to produce a given horsepower resulting in the added advantage of less heating of the motor. In addition, the magnitude of the instantaneous current in the coils of the new rotor at the end of the short circuiting period is only half that in the coils of the conventional rotor so that sparking and hence the resulting brush wear and radio noise is materially reduced. Because of the reduction in sparking, the winding is particularly useful in aircraft since it greatly simplifies the noise filtering apparatus necessary for the radio equipment and since it increases the life of the brushes which are subject to a high rate of wear when operating at high altitudes.

I claim as my invention:

1. In a rotor assembly for a motor, the combination of, a core adapted to be mounted for rotation about its axis, a commutator ring mounted on said core with its center coinciding with the axis of the core and divided into a plurality of segments including first, second and third segments disposed end to end for successive engagement by a brush of the motor and fourth, fifth and sixth segments diametrically opposite said first, second and third segments respectively, said segments being of equal arcuate length and insulated from each other, a first pair of coils wound on said core to lie in planes parallel to said axis and to each other, the terminals of one coil being connected respectively to said first and second segments and the terminals of the other coil being connected to said fourth and fifth segments, and a second pair of coils wound on said core to lie in planes parallel to said axis and to each other with one coil connected to said second and third segments and the other coil connected to said fifth and sixth segments, the angle between the planes of said first pair of coils and the planes of said second pair of coils being equal to the angle subtending the arc of a segment.

2. In a rotor assembly for a motor, the combination of, a core of magnetic material adapted to be mounted for rotation about its axis, a commutator ring mounted to turn with said core with its center coinciding with said axis and divided into a plurality of segments of equal arcuate lengths and insulated from each other to be engaged successively by a brush of the motor, a first coil wound on said core to lie in a plane paralleling said axis, the terminals of said coil being connected respectively to first and second segments immediately adjacent each other and adapted to be engaged successively by the motor brush, and a second coil connected at one terminal to said second segment and at the other terminal to the next succeeding segment and wound on said core to lie in a second plane paralleling said axis and defining with said first plane an angle equal to the angle subtending the arc of a segment.

3. In a motor having a stator producing a magnetic field, the combination of, a core mounted in the field of the stator and supported for rotation about its axis, a commuator ring centered about said axis and mounted to turn with said core, said ring being divided into a plurality of segments of equal arcuate lengths and insulated from each other for successive engagement with a brush of the motor, and a plurality of coils wound on said core to lie in planes disposed about and paralleling said axis and each having its terminals connected respectively to two segments immediately adjacent each other, the angle between the plane of one coil and the plane of any other coil being equal to the angle between the corresponding commutator segments of the two coils so that the angle through which each coil turns while short circuited by the brush of the motor is bisected by a plane perpendicular to the field of the stator.

4. A rotor assembly comprising, a core adapted to be mounted for rotation about its axis, a commutator ring mounted to turn with said core with its center coinciding with said axis and divided into a plurality of segments equal in arcuate length and insulated from each other, and a plurality of coils wound on said core to lie in planes disposed about and paralleling said axis and each having its terminals connected respectively to two segments immediately adjacent each other, the angle between the plane of one coil and the plane of any other coil being equal to the angle between the corresponding commutator segments of the two coils.

CLAUS G. JOHNSON.

No references cited.